US008307188B2

(12) United States Patent
Accapadi et al.

(10) Patent No.: US 8,307,188 B2
(45) Date of Patent: Nov. 6, 2012

(54) INFORMATION HANDLING SYSTEM MEMORY MANAGEMENT

(75) Inventors: Mathew Accapadi, Austin, TX (US);
Grover Cleveland Davidson, II, Austin, TX (US); Dirk Michel, Austin, TX (US);
Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/615,673

(22) Filed: Nov. 10, 2009

(65) Prior Publication Data

US 2011/0113214 A1 May 12, 2011

(51) Int. Cl.
*G06F 12/02* (2006.01)
(52) U.S. Cl. ........................... 711/173; 711/170
(58) Field of Classification Search ................. None
See application file for complete search history.

(56) References Cited

U.S. PATENT DOCUMENTS 5,339,411 A * 8/1994 Heaton, Jr. ............... 711/171
6,049,810 A * 4/2000 Schwartz et al. .......... 711/163
2005/0278488 A1 * 12/2005 Flemming et al. ......... 711/153
2006/0059453 A1 * 3/2006 Kuck et al. ................. 717/100
2008/0022066 A1 * 1/2008 Ahluwalia et al. ......... 711/170

OTHER PUBLICATIONS

Cavanna—"Initializing memory efficiently on Power Architecture platforms"—May 23, 2006, pp. 1-10.

* cited by examiner

*Primary Examiner* — Than Nguyen
(74) *Attorney, Agent, or Firm* — David Mims; Mark P Kahler

(57) ABSTRACT

An information handling system (IHS) loads an application that may include startup code and steady state operation code. The IHS allocates one region of system memory to the startup code and another region of system memory to the steady state operation code. A programmer inserts a memory release call command at a location that marks the end of execution of the startup code. After executing the startup code, the operation system receives the memory release call command. In response to the memory release call command, the operating system releases or de-allocates the region of memory to which the IHS previously assigned to the startup code. This enables the released memory for use by code other than the startup code, such as other code pages, library pages and other code.

17 Claims, 3 Drawing Sheets

100

US 8,307,188 B2

INFORMATION HANDLING SYSTEM MEMORY MANAGEMENT

BACKGROUND

The disclosures herein relate generally to information handling systems (IHSs), and more specifically, to memory systems that IHSs employ.

Information handling system (IHSs) employ processors that process information or data. The processor communicates with a memory that stores information for use by the processor. It is beneficial to manage the memory to promote IHS efficiency.

BRIEF SUMMARY

In one embodiment, a memory management method is disclosed. The method includes loading, by an information handling system (IHS), an application that includes a first code portion and a second code portion. The method also includes allocating, by the IHS, a first memory region to the first code portion and a second memory region to the second code portion. The method further includes executing the application, by the IHS, the application including a first command that indicates when the application no longer needs to access the first code portion to which the first memory region is allocated. The application still further includes receiving, by the IHS, the first command from the application. The method includes releasing, by the IHS in response to the first command, the first memory region for use other than by the first code portion.

In another embodiment, an information handling system (IHS) is disclosed. The IHS includes a processor and a memory coupled to the processor. The memory is configured with an operation system (OS) that loads an application that includes a first code portion and a second code portion. The OS allocates a first memory region to the first code portion and a second memory region to the second code portion. The OS executes the application, the application including a first command that indicates when the application no longer needs to access the first code portion to which the first memory region is allocated. The OS receives the first command from the application. In response to the first command, the OS releases the first memory region for use other than by the first code portion.

In yet another embodiment, a computer program product for memory management is disclosed. The computer program product includes a computer readable storage medium. The computer program product also includes first program instructions that load an application that includes a first code portion and a second code portion. The computer program product further includes second program instructions that allocate a first memory region to the first code portion and a second memory region to the second code portion. The application includes a first command that indicates when the application no longer needs to access the first code portion to which the first memory region is allocated. The computer program product still further includes third program instructions to receive the first command from the application. The computer program product also includes fourth program instructions to release, in response to the first command, the first memory region for use other than by the first code portion. The first, second, third and fourth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In one embodiment, an information handling system (IHS) includes a memory management system that controls the allocation of memory to an application. The programmer or coder writes an application that includes a first section of code that may include code such as initialization routines that execute before the application reaches steady state operation. Code, as used herein, may include both application code and data. The programmer codes the application to include a second section of code that executes after the first section of code. The second section of code may involve the performance of functions during which the application reaches steady study state operation after execution of the initialization routines completes. Steady state operation refers to the normal operation of an application after startup and initial testing completes.

When the application loads into the IHS, the IHS allocates a portion of system memory for the first section of code and another portion of system memory for the second section of code. The programmer codes a release command in the application to indicate to the IHS that the IHS is done executing the first section of code. In response to receiving the release command from the application as the application executes, the IHS releases the memory previously allocated to the first section of code of the application. The IHS is then free to allocate the released memory to other activities. In one embodiment, the operating system (OS) of the IHS receives the release command from the application and controls the release of the particular portion of memory that the release command identifies.

Figure 1:
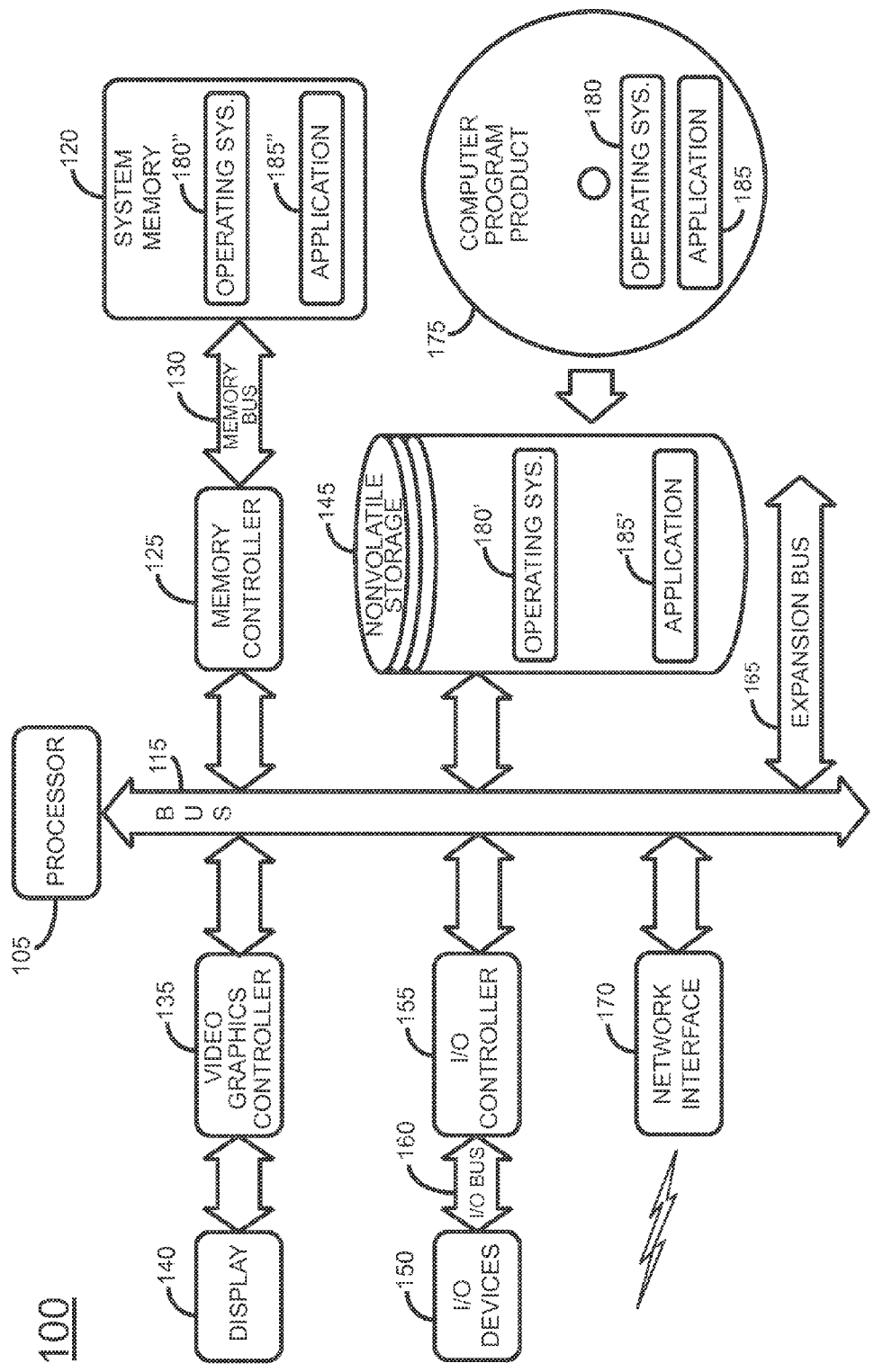
FIG. 1 shows a block diagram of one embodiment of the disclosed information handling system (IHS) with memory management capabilities.

FIG. 1 shows an information handling system (IHS) 100 that is configured to practice the disclosed memory management methodology. IHS 100 includes a processor 105 that may include multiple cores. IHS 100 processes, transfers, communicates, modifies, stores or otherwise handles information in digital form, analog form or other form. IHS 100 includes a bus 115 that couples processor 105 to system memory 120 via a memory controller 125 and memory bus 130. In one embodiment, system memory 120 is external to processor 105. System memory 120 may be a static random access memory (SRAM) array or a dynamic random access memory (DRAM) array. Processor 105 may also includes local memory (not shown) such as L1 and L2 caches (not shown). A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. I/O devices 150, such as a keyboard and a mouse pointing device, couple to bus 115 via I/O controller 155 and I/O bus 160. One or more expansion busses 165, such as USB, IEEE 1394 bus, ATA, SATA, PCI, PCIE and other busses, couple to bus 115 to facilitate the connection of peripherals and devices to IHS 100. A network interface adapter 170 couples to bus 115 to enable IHS 100 to connect by wire or wirelessly to a network and other information handling systems. While FIG. 1 shows one IHS that employs processor 105, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

IHS 100 includes a computer program product on digital media 175 such as a CD, DVD or other media. In one embodiment, digital media 175 includes an operating system 180 and an application 185 that are configured to practice the disclosed memory management methodology. In practice, IHS 100 may store operating system 180 on nonvolatile storage 145 as operating system 180' and further store application 185 on nonvolatile storage 145 as application 185'. When IHS 100 initializes, the IHS loads operating system 180' into system memory 120 for execution as operating system 180". Operating system 180' loads in memory 120 to govern the operation of IHS 100. IHS 100 also loads application 185' into system memory 120 as application 185".

Figure 2:
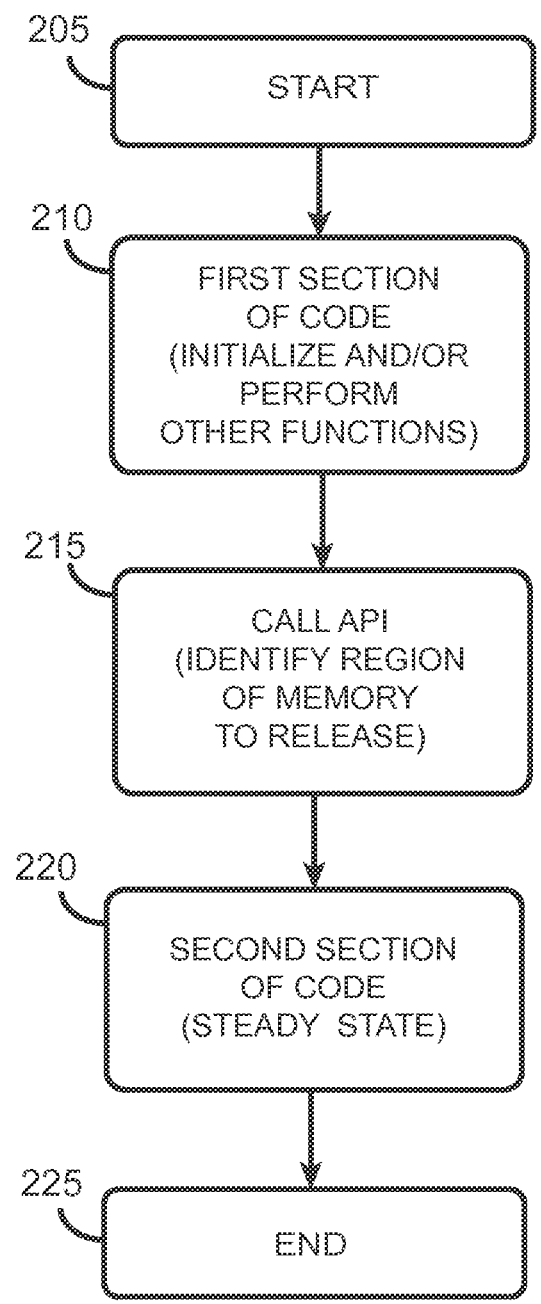
FIG. 2 is a flowchart of a representative application that the IHS of FIG. 1 executes when practicing the disclosed memory management system.

FIG. 2 is a flowchart that shows process flow in a representative application 185 that is configured to implement the disclosed memory management methodology. Prior to executing application 185", the operating system 180" allocates a first section of code of application 185" to a first memory region of memory 120. Operating system 180" also allocates a second section of code of application 185" to a second memory region of memory 120. After this allocation process, application 185" commences execution, as per start block 205. The first section of code executes, as per block 210. The first section of code may be initialization code or code that performs other functions. For example, the first section of code of application 180 may include startup routines and/or data and integrity check routines. In one embodiment, the first section of code of application 185 may include code that executes once and that IHS 100 will not need to execute again subsequently. In another embodiment, the first section of code may include code that executes before application 185 reaches steady state execution. Steady state execution refers to execution of the main body of code of application 185 in normal operation after initialization.

The programmer determines a location in application 185 where initialization is complete and steady state execution is about to commence. This is the memory release point at which the programmer inserts a memory RELEASE CALL command to operating system 180. The memory RELEASE CALL command instructs operating system 180 to release or de-allocate the first memory region that the OS previously allocated to the first section of code of application 185. In other words, the memory RELEASE CALL command identifies the particular region in memory 120 that OS 180 is to release for use by other code, as per block 215. OS 180 executes the second section of code of application 185, as per block 220. Execution of the second section of code corresponds to steady state operation of application 185. This in the normal operational mode of application 185 after startup and initialization completes. When execution is complete or the user terminates application 185, application 185 ends, as per end block 225.

Figure 3:
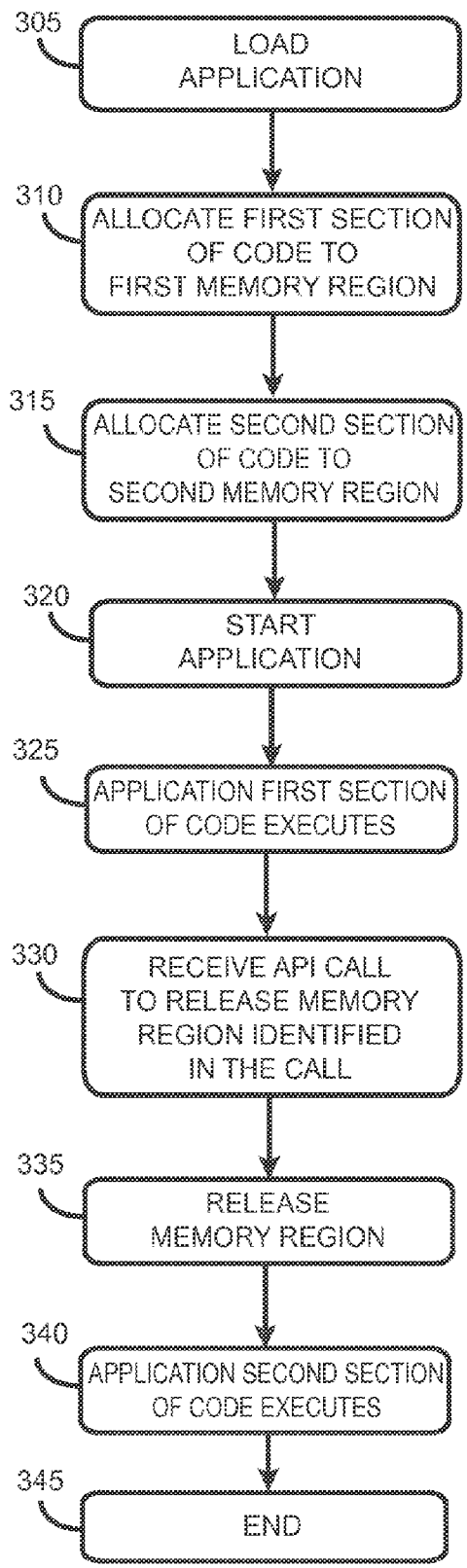
FIG. 3 is flowchart that depicts process flow when the operating system of the IHS practices the disclosed memory management method.

FIG. 3 is a flowchart that shows process flow in a representative operating system (OS) 180 that is configured to implement the disclosed memory management methodology. OS 180 loads application 185, as per block 305. OS 180 allocates the first section of code of application 185 to the first memory region in memory 120, as per block 310. As described above, this first section of code may correspond to initialization routines, data integrity routines and other code that executes before application 185 reaches steady-state operation. OS 180 allocates the second section of code application 185 to the second memory region of memory 120, as per block 315. This second section of code correspond to functions that application 185 performs when application 180 reaches steady-state operation.

With memory thus allocated to the first section of code and the second section of code of application 180, OS 180 starts executing application 185, as per start block 320. The first section of code of application 185 executes, as per block 325. OS 180 includes an application interface, API, that monitors for a memory RELEASE CALL command from application 185, as per block 330. When OS 180 receives a memory RELEASE CALL command, OS 180 releases the particular memory region of memory 120 that the memory release call command identifies. In this example, OS 180 receives a memory RELEASE CALL command identifying the first memory region in memory 120 as the particular memory region that OS 180 should free or release. Thus, OS 180 releases the first region of memory 120 for use by IHS 100, as per block 335. The second section of code of application 185 executes, as per block 340. The process ends, as per block 345.

In one embodiment, IHS 100 allocates a memory region in memory 120 to a particular section of code of application 185 by associating a virtual address for the particular section of code with a physical address range in memory 120. IHS 100 marks the physical address range as computational. IHS 100 populates this physical address range in memory 120 with the particular section of code. The particular section of code in the memory region of memory 120 may be a code page, a library page or other information. A code page is a memory page that stores code in binary form ready for execution. When OS 180 receives the memory RELEASE CALL command, it releases the memory region that the release call command identifies. To release the identified memory region, OS 180 disassociates the virtual address of the identified memory region from the physical memory 120. As part of the release process, IHS 100 may zero-fill the identified memory region in memory 120. In one embodiment, if a program later attempts to access the identified memory region in memory 120, IHS 100 zero-fills the identified memory region in response to that access attempt. Upon receiving the memory RELEASE CALL command, OS 180 may immediately release the identified memory region or may target the identified memory region for release at a later time.

In one embodiment, the initialization of IHS 100 may include multiple phases, each with its own section of code and respective allocated memory region in memory 120. In that case, the programmer may insert a respective memory RELEASE CALL command after each section of code of application 185. For example, the programmer may insert a memory RELEASE CALL command after a first section of startup code and another memory RELEASE CALL command after a second section of startup code. A third section of code corresponding to steady state operation of the application follows the second section of startup code and its respective memory RELEASE CALL command. In this scenario, OS 180 of IHS 100 allocates a first memory region to the first section of startup code and a second memory region to the second section of startup code. OS 180 allocates a third memory region to the third section of code that corresponds to steady state operation. When application 120 executes and OS 180 receives the memory RELEASE CALL command after the first section of startup code, IHS 100 releases the first memory region that IHS 100 previously allocated to the first section of startup code. When application continues execution and OS 180 receives the memory RELEASE CALL command after the second section of startup code, IHS 100 release the second memory region that IHS 100 previously allocated to the second section of startup code. OS 180 is thus free to use the first and second regions of memory that would otherwise be unavailable for use.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A memory management method, comprising:
   loading, by an information handling system (IHS), an application that includes a first code portion and a second code portion;
   allocating, by the IHS, a first memory region to the first code portion and a second memory region to the second code portion, wherein the first code portion relates to initialization of the application and the second code portion relates to steady state operation of the application;
   executing the application, by the IHS, the application including a first command that indicates when the application transitions from initialization to steady state operation of the application;
   receiving from the application, by the IHS, the first command that indicates when the application transitions from initialization to steady state operation of the application; and
   releasing, by the IHS in response to the first command that indicates when the application transitions from initialization to steady state operation of the application, the first memory region for use other than by the first code portion.

2. The memory management method of claim 1, wherein the first command is an application program interface (API) that identifies a region in memory to release.

3. The memory management method of claim 1, wherein the releasing step comprises disassociating a virtual address of the first code portion from a corresponding physical address in memory allocated to the first code portion.

4. The memory management method of claim 1, wherein the releasing step comprises releasing a code page in the memory.

5. The memory management method of claim 1, wherein the releasing step comprises releasing a library page in the memory.

6. The memory management method of claim 1, further comprising:
   loading, by the IHS, a third code portion included in the application;
   allocating, by the IHS, a third memory region to the third code portion, the application including a second command that indicates when the application no longer needs access to the second code portion to which the second memory region is allocated;
   receiving, by the IHS, the second command from the application; and
   releasing, by the IHS, in response to the second command the second memory region for use other than by the second code portion.

7. An information handling system (IHS), comprising:
   a processor,
   a memory, coupled to the processor, the memory being configured with an operation system that:
      loads an application that includes a first code portion and a second code portion;
      allocates a first memory region to the first code portion and a second memory region to the second code portion, wherein the first code portion relates to initialization of the application and the second code portion relates to steady state operation of the application;
      executes the application, the application including a first command that indicates when the application transitions from initialization to steady state operation of the application;
      receives from the application the first command that indicates when the application transitions from initialization to steady state operation of the application; and
      releases, in response to the first command that indicates when the application transitions from initialization to steady state operation of the application, the first memory region for use other than by the first code portion.

8. The IHS of claim 7, wherein the first command is an application program interface (API) that identifies a region in memory to release.

9. The IHS of claim 7, wherein the IHS disassociates a virtual address of the first code portion from a corresponding physical address in memory allocated to the first code portion to release the first memory region for use other than by the first code portion.

10. The IHS of claim 7, wherein the IHS releases a code page in the memory to release the first memory region for use other than by the first code portion.

11. The IHS of claim 7, wherein the IHS releases a library page in the memory to release the first memory region for use other than by the first code portion.

12. The IHS of claim 7, wherein the memory is further configured with the operating system that:
   loads a third code portion included in the application;
   allocates a third memory region to the third code portion, the application including a second command that indicates when the application no longer needs access to the second code portion to which the second memory region is allocated;
   receives the second command from the application; and
   releases, in response to the second command, the second memory region for use other than by the second code portion.

13. A computer program product for memory management, comprising:
   a non-transitory computer readable storage medium;
   first program instructions to load an application that includes a first code portion and a second code portion;
   second program instructions to allocate a first memory region to the first code portion and a second memory region to the second code portion, wherein the first code portion relates to initialization of the application and the second code portion relates to steady state operation of the application, the application including a first command that indicates when the application transitions from initialization to steady state operation of the application;

third program instructions to receive from the application the first command that indicates when the application transitions from initialization to steady state operation of the application; and fourth program instructions to release, in response to the first command that indicates when the application transitions from initialization to steady state operation of the application, the first memory region for use other than by the first code portion;

wherein the first, second, third and fourth program instructions are stored on the computer readable storage medium.

14. The computer program product of claim 13, wherein the first command is an application program interface (API) that identifies a region in memory to release.

15. The computer program product of claim 13, wherein the fourth program instructions include instructions that disassociate a virtual address of the first code portion from a corresponding physical address in memory allocated to the first code portion.

16. The computer program product of claim 13, wherein the fourth program instructions include one of instructions that release a code page in the memory and instructions that release a library page in the memory.

17. The computer program product of claim 13, further comprising:

fifth program instructions that load a third code portion included in the application;

sixth program instructions that allocate a third memory region to the third code portion, the application including a second command that indicates when the application no longer needs access to the second code portion to which the second memory region is allocated;

seventh program instructions that receive the second command from the application; and eighth program instructions that release, in response to the second command, the second memory region for use other than by the second code portion, wherein the fifth, sixth, seventh and eighth program instructions are stored on the computer readable storage medium.

\* \* \* \* \*